United States Patent [19]

Wilson, Sr. et al.

[11] Patent Number: 4,608,238

[45] Date of Patent: * Aug. 26, 1986

[54] PROCESS FOR TREATING PHOSPHO-GYPSUM WASTE PRODUCT FROM WET-ACID PROCESS OF MAKING PHOSPHORIC ACID

[76] Inventors: Eddie K. Wilson, Sr., 8294 Dogwood Rd., Germantown, Tenn. 38138; Silvio J. Spigolon, 1800 Randolph Pl., No. 4, Memphis, Tenn. 38119

[*] Notice: The portion of the term of this patent subsequent to Jan. 26, 1999 has been disclaimed.

[21] Appl. No.: 634,965

[22] Filed: Jul. 27, 1984

[51] Int. Cl.$^4$ .............. C01F 1/00; C01F 5/10; C01F 25/16

[52] U.S. Cl. .................. 423/178; 423/241; 423/248; 423/304; 423/320; 423/483; 423/522; 423/541 R

[58] Field of Search ............ 423/316, 317, 319, 320, 423/321 R, 321 S, 541 R, 530, 522, 166, 167, 178, 241, 248, 483, 304

[56] References Cited

U.S. PATENT DOCUMENTS

| | | | |
|---|---|---|---|
| 3,260,035 | 7/1966 | Wheelock et al. | 423/541 |
| 3,323,864 | 1/1967 | Lapple | 423/167 |
| 4,312,842 | 1/1982 | Wilson et al. | 423/320 |
| 4,415,543 | 11/1983 | Wilson et al. | 423/320 |

FOREIGN PATENT DOCUMENTS 52-17390 9/1977 Japan .................. 423/167

Primary Examiner—Gregory A. Heller
Attorney, Agent, or Firm—Gravely, Lieder & Woodruff

[57] ABSTRACT

This disclosure concerns an improved phospho-gypsum recovery process in which phospho-gypsum waste product and coke are first heated to remove moisture, some $SO_2$ and other vaporous matter, then heated to a higher temperature in a reducing atmosphere to remove and separately recover $SO_2$, then further heated in an oxidizing atmosphere to about 1200° to 1250° C. to remove any unreacted carbon and calcium sulfide before entering an electric furnace. The disclosure also concerns passing the gas stream from the condenser-heat exchanger over the clinker from the electric furnace to scrub $SO_2$ from said gas stream. The essence of the invention is the unique absorber system used to remove any and all remaining fluorine in the gases from the calciner/furnace. If not removed, the fluorine will severely harm the catalyst used in the contact sulfuric acid plant to which the gases are sent for recovery of sulfur values. The absorber system uses a sulfuric acid absorber folowed by a water absorber.

9 Claims, 1 Drawing Figure

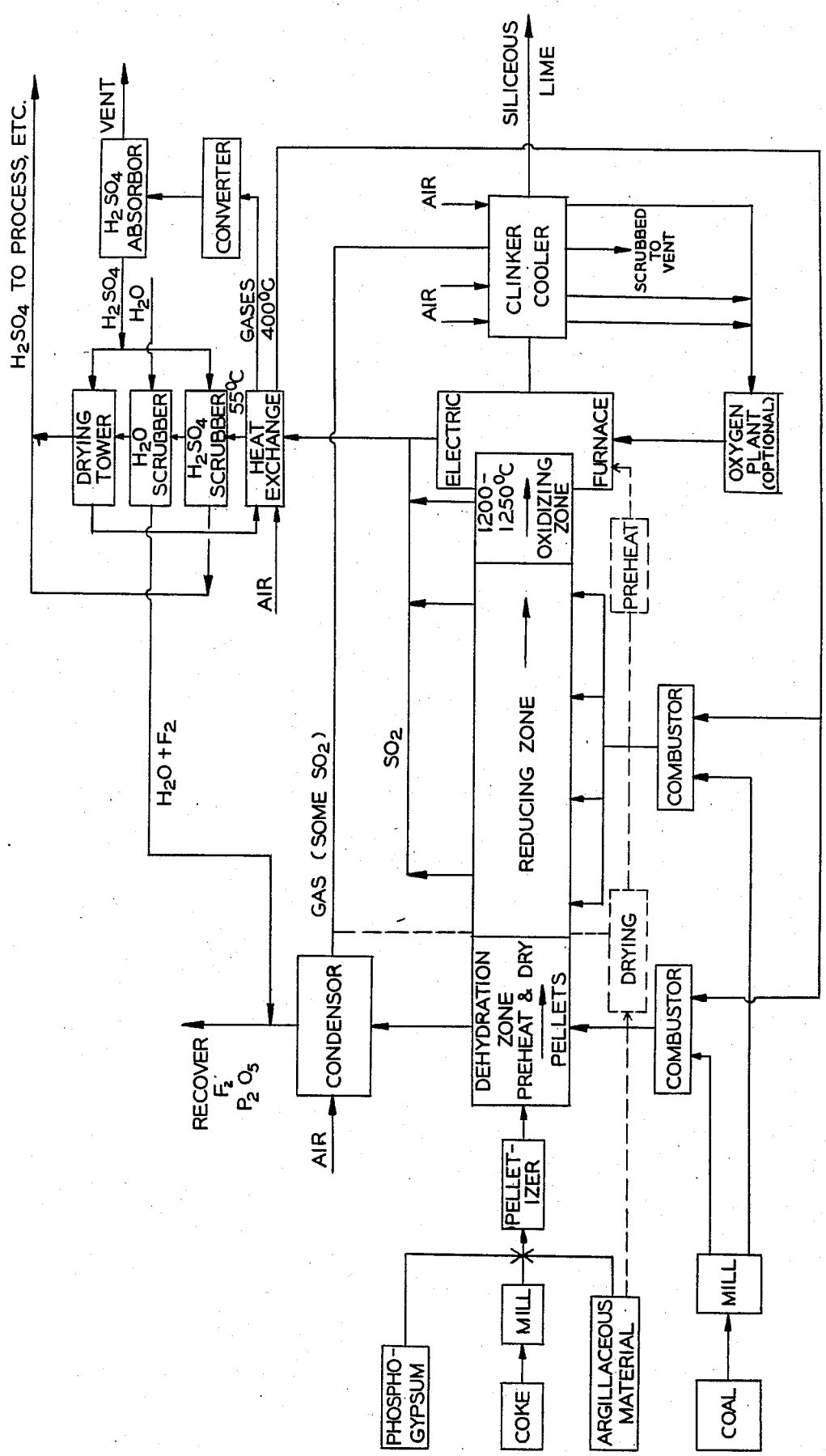

PROCESS FOR TREATING PHOSPHO-GYPSUM WASTE PRODUCT FROM WET-ACID PROCESS OF MAKING PHOSPHORIC ACID

REFERENCE TO PRIOR APPLICATION

This application is related to, contains subject matter in common with, and is a continuation-in-part of Ser. No. 342,474 filed Jan. 25, 1982 entitled PROCESS FOR TREATING PHOSPHO-GYPSUM WASTE PRODUCT FROM WET-ACID PROCESS OF MAKING PHOSPHORIC ACID (now U.S. Pat. No. 4,415,543) which was co-pending with U.S. Pat. No. 4,312,842 issued Jan. 26, 1982 entitled PROCESS FOR MANUFACTURE OF PHOSPHORIC ACID WITH RECOVERY OF CO-PRODUCTS, and of Ser. No. 551,051 filed Nov. 11, 1983 entitled IMPROVED PROCESS FOR TREATING PHOSPHO-GYPSUM WASTE PRODUCT WET-ACID PROCESS OF MAKING PHOSPHORIC ACID now abandoned.

BACKGROUND OF THE INVENTION

As discussed in detail in U.S. Pat. No. 4,312,842 and in co-pending applications Ser. No. 342,474 and Ser. No. 551,051 (the substances of which are herein incorporated by reference), this invention relates to the wet process or acid process of making phosphoric acid, and particularly relates to the removal of fluorine and phosphorus values from the sulfur dioxide containing gases evolving from the preheater and the calciner/furnace treatment of the waste phospho-gypsum. The gas stream is cleaned of fluorine to a level which makes the gas acceptable for use with a vanadium oxide catalyst (or other type catalyst) in a contact sulfuric acid plant and the gas has a composition which is desired for efficient operation of the sulfuric acid plant.

The prior art is succinctly described in U.S. Pat. No. 4,312,842 and in co-pending U.S. Pat. No. 4,415,543 and the present application is different from and in certain aspects an improvement on U.S. Pat. No. 4,415,543 in that we eliminate the water wash and filter step of phospho-gypsum treatment just prior to preheating. Instead, we now prefer to secure the phospho-gypsum directly from the final filter or stockpile of the conventional plant operation, pelletize it or otherwise intermix it with coke or other source of carbon, and heat it in a four stage operation.

The first stage is a preheater or dryer where combustion gases heat the phospho-gypsum to over 200 degrees C. After the pellets are preheated, the combustion gases contain water vapor, fluorine and phosphorus and are fed to a condenser which will remove most of the water, fluorine, and phosphorus. These values are then recovered by conventional technology. The gases also contain sulfur dioxide gas from the fossil fuel and the gases are then fed to a clinker cooler where they are passed over a hot clinker and scrubbed by the lime in the clinker.

The second and third stages are a calciner having first a reducing atmosphere zone, followed by a higher temperature oxidizing atmosphere zone. Gases evolved from the calciner are sent to a scrubber system.

The solid residue of the waste phospho-gypsum is then placed in an electric furnace (fourth stage) where the remaining volatiles are evolved. These gases are combined with the gases from the calciner prior to entry in the scrubber. The gas scrubber, which is a major element of this invention, consists of a first sulfuric acid gas scrubber followed by a water scrubber. This unique combination removes virtually all of the fluorine and phosphorus from the gases, leaving them in a form acceptable and desirable for use in a modern contact process sulfuric acid plant.

DESCRIPTION OF THE DRAWING

The FIGURE is a schematic diagram of a portion of a flow chart for the improved process of treating the phospho-gypsum from a typical phosphoric acid plant.

DETAILED DESCRIPTION

Broadly speaking, as in U.S. Pat. No. 4,312,842 and in U.S. Pat. No. 4,415,543, the process of the present invention involves the complete utilization of natural phosphate rock in commercially valuable products, leaving only common, innocuous, and ubiquitous gases as a residue. The presently used wet-acid process for using phosphate rock to manufacture phosphoric acid leaves a waste residue of impure phospho-gypsum which is uneconomical and is environmentally repugnant and hazardous. The improvements in the process, claimed in this invention, include elimination of the supplementary water wash and filteration step which followed the final process filter of U.S. Pat. No. 4,415,543, the collection of gases from the preheater/dehydrator in a condenser unit which will remove all water, fluorine, and phosphorus values in the liquid phase for recovery, the passing of the dried, sulfur dioxide containing gases over the hot clinker residue from the electric furnace which will scrub out the sulfur dioxide, and the collection of gases from the calciner and from the electric furnace and passage of those gases through a conventional alkali recovery system and then through a scrubber absorber consisting first of a sulfuric acid bath and secondly of a water bath, with this unique scrubber absorber system being capable of removing virtually all except a trace of the fluorine from the gases and making them acceptable for use with a sulfuric acid plant using a catalyst converter.

The improved process will work with all types of natural phosphate rock. Following is a typical chemical analysis:

| Composition of Florida Phosphate Rock - 70/68 BPL (From - A. V. Slack, "Phosphoric Acid", Vol. 1, Pt. 1, 1968) | |
| --- | --- |
| CaO | 47.14% |
| $P_2O_5$ | 32.23 |
| $H_2O$ | 1.00 |
| $Fe_2O_3$ | 1.26 |
| $Al_2O_3$ | 0.96 |
| Organic | 1.74 |
| $SiO_2$ | 8.72 |
| $CO_2$ | 2.93 |
| $F_2$ | 3.09 |
| $SO_3$ | 0.93 |
| | 100.00% |

Following are basic reactions involved in the wet process method of making phosphoric acid. As an illustration, based on one ton (2000 lbs.) of phosphate rock having the composition shown above, the noted amounts of sulfuric acid ($H_2SO_4$) and water are added to the reaction:

| Quantities of Reactants - Per Ton (2000 lbs.) Phos. Rock: |
| --- |
| (1) $Ca_3(PO_4) + 3H_2SO_4 \quad 2H_3PO_4 + 3CaSO_4$ |

-continued

|   | 1408.6# | 1336.2# | = 889.9# | + 1854.9# | |
|---|---|---|---|---|---|
| (2) | CaF$_2$ | + H$_2$SO$_4$ | 2HF | + CaSO$_4$ | |
|   | 127.0# | 159.6# | = 65.1# | + 221.5# | |
| (3) | 6HF | + SiO$_2$ | H$_2$SiF$_6$ | + 2H$_2$O | |
|   | 65.1# | 32.6# | = 78.1# | + 19.6# | |
| (4) | CaCO$_3$ | + H$_2$SO$_4$ | CO$_2$ | + H$_2$O | + CaSO$_4$ |
|   | 133.2# | + 130.5# | = 58.6# | + 24.0# | = 181.1# |

| | | Per Ton Phos. Rock |
|---|---|---|
| Add | Phosphate Rock | 2000# |
|  | H$_2$SO$_4$ (100% Basis) | 1626.3# |
|  | H$_2$O | 1666.5# |
| To Yield | H$_3$PO$_4$ (100% Basis) | 889.9# |
|  | P$_2$O$_5$ (100% Basis) | 644.5# |
|  | Product Acid (30% P$_2$O$_5$) | 2148.0# |
|  | (HF) | (65.1#) |
|  | H$_2$SiF$_6$ | 78.1# |
|  | CO$_2$ Gas | 58.6# |
|  | CaSO$_4$.2H$_2$O | 2895.0# |
|  | (CaSO$_4$) | (2289.1#) |
|  | SiO$_2$ | 141.8# |
|  | Al$_2$O$_3$ | 19.2# |
|  | Fe$_2$O$_3$ | 25.2# |
|  | Phospho-gypsum | 3081.2# |

From this example, it may be seen that the waste product gypsum far exceeds the useful product acid in quantity.

Because the conventional process, and most commercial processes of similar type, do not yield 100% of the available products in the natural ore, the phospho-gypsum waste may contain some unreacted ore, perhaps as much as 3 to 5%. Also, the liquid phase of the phospho-gypsum contains fluorine compounds and residual phosphoric and sulfuric acid. In U.S. Pat. No. 4,415,543 there is shown a water wash and vacuum filter combined with a preheater to remove a portion of the P$_2$O$_5$ and substantially all of the fluorine values from the phospho-gypsum before it goes to the calciner where the SO$_2$ is produced. This allows uncontaminated SO$_2$ to be produced for the acid plant.

In U.S. Pat. No. 4,415,543 are shown and described processes for making wet-process phosphoric acid and for treating the phospho-gypsum filter residue to remove P$_2$O$_5$ and substantially all of the fluorine values from the liquid phase of the phospho-gypsum before it goes to the calciner where the SO$_2$ is produced. This allows uncontaminated SO$_2$ to be produced for the acid plant.

In U.S. Pat. No. 4,415,543 are shown and described processes for making wet-process phosphoric acid and for treating the phospho-gypsum filter residue to remove P$_2$O$_5$, fluorine values, and sulfur values as utilizable products. This process utilizes a calcining step where the phospho-gypsum material is heated from 850° C. to about 1250° C. in the presence of coal or other fossil fuel which releases SO$_3$ which then oxidizes to SO$_2$ along with other combustion gases and excess heated air. The SO$_2$ containing gas stream goes to a cooler and a sulfuric acid plant if one is in-house at the plant. The sulfuric acid generated from the SO$_2$ can be used in the phosphoric acid process described in U.S. Pat. No. 4,415,543, or it can be processed and sold. The composition of the gas stream, especially the sulfur dioxide and the oxygen contents, must be matched to the requirements of the sulfuric acid plant. Most modern sulfuric acid plants need 10% SO$_2$ and 10% O$_2$ to operate efficiently. It is imperative that the fluorine level in the gas stream be kept below that which will cause damage to the catalyst used in the sulfuric acid plant.

In U.S. Pat. No. 4,415,543, the calciner residue is mixed with inorganic oxides in the form of preheated clay and the mixture is fed into an electric furnace where it is melted at a temperature of up to 1650° C. A good portion of the P$_2$O$_5$ and alkali values are gasified, removed from the furnace, condensed, recovered, and stored for future use or sale. The electric furnace may be of any design, i.e., induction, resistance, joule principal, arc or plasma-arc that will permit the necessary energy transfer, at the required temperature, for melting the materials. The preferred type is the joule principal type although other types of electric furnaces may be used.

In U.S. Pat. No. 4,415,543, the clinker from the electric furnace is deposited in a clinker cooler where it is cooled with air passed over it. The cooling air is heated by contact with the clinker and is recouped to assist in heating the dehydration unit or the calciner.

The present invention involves an improvement in the method for removing and recovering the fluorine, phosphorus and sulfur values from the phospho-gypsum, leaving the gas stream from the calciner/furnace system acceptable for use in a modern contact sulfuric acid plant. The water wash and vacuum filter shown in U. S. Pat. No. 4,415,543 immediately preceeding the preheater is eliminated from the process. Instead, the gases from the calciner and from the furnaces are combined and scrubbed of fluorine by a unique scrubber absorber consisting of a sulfuric acid bath followed by a water bath.

As shown in the attached drawing, the phospho-gypsum and a source of carbon (coke is preferred) are combined in stoichiometric quantities and formed into pellets before being heated, first by a preheater/dryer, then by a calciner, and finally by an electric furnace. The pellet forming equipment is commercially available from several sources and forms no part of this invention. Whenever a travelling grate type of calciner is used, the pellet form is convenient. Other types of calciners may be used, such as fluidized beds, kilns, roasters, and other commercially available types. Although the mixture of phospho-gypsum and carbon (coke) is desired, the pelletizing step may not be appropriate for these other forms of calciner. The example of a travelling grate shown on the attached drawing is not intended to limit the invention to that type of dryer, preheater, and calciner. Furthermore, argillaceous materials (such as clay) may be added to the phospho-gypsum and carbon mixture in the pellets, if desired, as shown by solid lines on the figure. Or, if desired, the argillaceous material, added to improve the rate of calcination, may be added separately to the mixture at the furnace, by-passing the preheater/calciner. This form of the process is shown by the broken lines in the figure. The argillaceous material is useful to act as a flux, lowering the melting point of the calcareous residue in the furnace, which aids the tapping, or removal, process.

The phospho-gypsum is the filter cake from a filter system where a substantial portion of the fluorine and phosphorus in the liquid phase was separated from the phospho-gypsum by a water wash and vacuum filter treatment.

In addition, most of the remainder of the fluorine values in the liquid phase are released in the preheater/dehydration unit along with the water vapor as gases and substantially are all recovered in the condenser heat exchanger. The products of combustion of the fossil fuel burned to heat the phospho-gypsum and argillaceous materials leaves the dehydration unit as gases and combine with the other gases. The gases are then cooled sufficiently to condense the water vapor and other associated condensable gases. These are recovered and returned to the process or sent to a treatment plant for recovery of the fluorine and/or other products and the water neutralized before disposal.

From the preheating zone, the pellets move along the travelling grate to the reducing zone where they are heated to about 1050° C. and the carbon (coke) reduces the $CaSO_4$ to CaO, $SO_2$, and $CO_2$. In addition, as is typical of all commercial processes, a small percentage of the reduction reaction remains incomplete and some $SO_3$, CaS, and unreacted carbon are produced. The hot gases containing the $SO_2$ are mixed with gas streams released subsequently in the process from the oxidizing zone and the electric furnace and passed to a heat exchanger where they are cooled to about 55° C. and substantially all the $SO_3$ is reduced to $SO_2$ and sent to an absorber system for further removal of fluorine prior to submission as feed to a sulfuric acid plant. The resulting sulfuric acid is then available for use in the basic phosphoric acid plant or sale to other markets.

The fluorine absorber system, which is the essence of the present invention, uses sulfuric acid as the first step to condition the gas stream from the calciner/furnace; this is followed by a water absorber step to finally remove the fluorine contained in the gases.

As shown in the attached drawing, the combustion gases from the reduction and the oxidation zones of the calciner are combined with the gases evolving from the condenser and the electric furnace. The calciner gases will contain sulfur dioxide and various hydrogen-fluorine compounds. The electric furnace gases will also contain sulfur oxides, a trace of fluorine compounds, and whatever alkalies were contained in any argillaceous materials added at the furnace. The amount of uncalcined calcium sulfate left at the end of the calciner stage will determine the amount of sulfur oxides that will be added to the gas stream by the furnace.

The gas stream is first cooled to about 55 degrees C. in a heat exchanger. It is then fed directly to a sulfuric acid scrubber absorber similar to the type of absorber used in a conventional sulfuric acid plant. In this scrubber absorber, the sulfuric acid strips the hydrogen from the hydrogen-fluorine compounds. The gases are then fed to a water absorber where the fluorine compounds are absorbed by the water. The sulfuric acid is sent to the calcium phosphate rock/phosphoric acid processing plant. The water containing the fluorine compounds is added to the water from the preheater/dryer condenser where it is sent to a fluorine recovery system of conventional design. The fluorine recovery from the water is known technology and is not included in this invention. Using this system, all but trace amounts of fluorine will be removed from the sulfur dioxide containing gas stream, leaving the stream sufficiently free of fluorine to be acceptable for use with the catalyst of the contact sulfuric acid plant. The concentrations of sulfur dioxide and of oxygen in the gases is a function of the amount of calcium sulfate calcination done in the electric furnace.

From the reducing zone, the residual phospho-gypsum materials are moved to an oxidizing zone where they are heated in the presence of excess oxygen to about 1200° C. to 1250° C. The oxygen can be heated air or pure $O_2$ from an oxygen generating plant, if desired.

The oxidizing zone removes the unreacted carbon as $CO_2$ and reduces the calcium sulfide before the materials enter the electric furnace. The carbon is from the reduction coke and, if not removed, forms calcium carbide in the heat of the electric furnace.

For purposes of illustrating this invention, it has been described in the context of a traveling grate or grates which utilize the pelleted form of feed materials for con-venience. In a typical such installation, the traveling grate has an overall length of approximately 200 feet and moves about 9.9 feet/minute. These figures can be varied depending on the type and quality of feed, etc. The dehydrating zone is adjusted so that the temperature of the feed is sufficient to vaporize the gaseous materials, such as fluorine and unbound and bound water, without evolving any significant amount of $SO_2$ Generally this is in the range of 400°–500° F. The reducing zone is sized and the temperature raised to a level where substantially all of the $SO_2$ is evolved. The temperature is maintained below the point where the materials start to agglomerate. A reducing zone temperature in the vicinity of 1050° C. usually is satisfactory. The temperature of the oxidizing zone is raised as high as possible and is limited only by the equipment and the melting point of the materials. We do not want to melt the feed until it goes into the electric furnace. The time and temperature of the oxidizing zone is such that all of the unreacted carbon and calcium sulfide are removed from the pellets prior to their movement into the electric furnace. A typical installation has about a two minute hold in the oxidizing zone at a temperature of 1200°–1250° C.

The gases from the oxidizing zone contain $SO_2$ and $CO_2$ and are passed to the sulfur dioxide recovery station previously discussed.

From the oxidizing zone the phospho-gypsum materials are passed into an electric furnace where they are heated to about 1650° C. to remove elemental phosphorus and to combine with other added inorganic materials, if desired.

The residue from the electric furnace, called the clinker, is cooled in a clinker cooler where air is passed over it. The heated air then is used in the combustion units as preheated combustion or heated air.

The air from the heat exchanger-condenser associated with the preheater/dryer contains some $SO_2$ and this air is passed over the clinker also. The clinker being siliceous lime is a good scrubber for $SO_2$ when within the proper temperature range, approximately 400°–500° C. When the exhaust air stream containing $SO_2$ reacts and combines with the siliceous lime clinker and the expense of running this gas through a conventional scrubbing plant is avoided.

Thus, it is seen that this invention achieves all of the objects and advantages claimed therefor.

What is claimed is:

1. In a process for treating phospho-gypsum waste product which is produced in the manufacture of phosphoric acid by the wet-acid process in which suitable phosphate rock is treated with sulfuric acid to produce phosphoric acid and in which a mixture of phospho-gypsum waste product and carbonaceous material is heated to produce a mixture of gaseous $SO_2$, $P_2O_5$ containing materials and HF containing materials, the improvement which comprises heating the mixture of phospho-gypsum waste product and carbonaceous material first at a reducing temperature and then at an oxidizing temperature to produce HF containing materials, containing hydrogen and fluorine values, passing the HF containing materials through an $H_2SO_4$ scrubber to strip off the hydrogen values and subsequently washing the remainder with water to remove the fluorine values.

2. The process of claim 1 wherein the carbonaceous material is coke.

3. A phospho-gypsum recovery process comprising the steps of heating phospho-gypsum waste product produced in the manufacture of phosphoric acid by the wet-acid process and coke in a reducing atmosphere to produce $SO_2$ and HF compounds, further heating the phospho-gypsum waste product in an oxidizing atmosphere, and subsequently heating the phospho-gypsum waste product in an electric furnace to vaporize substantially all remaining phosphorus values and form a lime containing clinker, collecting the $SO_2$, HF compounds containing hydrogen and fluorine values and $P_2O_5$ values in a gaseous stream, cooling the stream and scrubbing the stream with $H_2SO_4$ to remove hydrogen values, subsequently scrubbing the stream with water to remove the fluorine-free stream into a converter with oxygen to produce $SO_3$.

4. The process of claim 3 wherein the mixture is heated with excess oxygen to a temperature of about 1200° to about 1250° C.

5. The process of claim 3 wherein the mixture is heated in the electric furnace to a temperature of about 1650° C.

6. The process of claim 3 wherein the mixture is heated in the reducing zone to about 1050° C.

7. The process of claim 3 including steps of mixing the phospho-gypsum waste product with argillaceous materials and coke and forming said mixture into pellets.

8. The process of claim 7 wherein said pellets are placed on a traveling grate, and heated in increments along the path of said grate.

9. The process of claim 3 wherein the argillaceous materials are dehydrated and preheated separately from the phospho-gypsum waste material and coke, and combined in the electric furnace.

* * * * *